United States Patent
Stockhammer et al.

(10) Patent No.: US 11,564,018 B2
(45) Date of Patent: Jan. 24, 2023

(54) RANDOM ACCESS AT RESYNC POINTS OF DASH SEGMENTS

(71) Applicant: QUALCOMM Incorporated, San Diego, CA (US)

(72) Inventors: Thomas Stockhammer, Bergen (DE); Imed Bouazizi, Frisco, TX (US); Waqar Zia, Munich (DE)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/061,152

(22) Filed: Oct. 1, 2020

(65) Prior Publication Data
US 2021/0105542 A1  Apr. 8, 2021

Related U.S. Application Data

(60) Provisional application No. 62/909,642, filed on Oct. 2, 2019.

(51) Int. Cl.
*H04N 21/845* (2011.01)
*H04N 21/234* (2011.01)
(Continued)

(52) U.S. Cl.
CPC ......... *H04N 21/8456* (2013.01); *H04L 65/70* (2022.05); *H04N 7/54* (2013.01);
(Continued)

(58) Field of Classification Search
CPC .... H04L 65/607; H04N 7/54; H04N 21/2365; H04N 21/85406; H04N 2201/04748
(Continued)

(56) References Cited

U.S. PATENT DOCUMENTS

2014/0222962 A1  8/2014  Mao et al.
2015/0358382 A1  12/2015  Chen et al.
(Continued)

FOREIGN PATENT DOCUMENTS

EP  2908535 A1  8/2015
WO  2016014129 A1  1/2016
(Continued)

OTHER PUBLICATIONS

Fielding R., et al., "Hypertext Transfer Protocol—HTTP/1.1", Network Working Group, Request for Comments, RFC 2616, Standards Track, Jun. 1999, pp. 1-114.
"Information Technology—Dynamic Adaptive Streaming Over HTTP (DASH)—Part 1: Media Presentation Description and Segment Formats", ISO/IEC 23009-1, International Standard, Draft Third Edition, Jan. 9, 2017, 216 pages.
(Continued)

*Primary Examiner* — Dominic D Saltarelli
(74) *Attorney, Agent, or Firm* — Shumaker & Sieffert, P.A.

(57) ABSTRACT

A device for retrieving media includes a memory configured to store media data of a media presentation; and one or more processors implemented in circuitry and configured to: retrieve a manifest file for a media presentation indicating that container parsing of media data of a bitstream can be started at a resync point of a segment of a representation of the media presentation, the resync point being at a position other than a start of the segment and representing a point at which the container parsing of the media data of the bitstream can be started; use the manifest file to form a request to retrieve the media data of the representation starting at the resync point; send the request to initiate retrieval of the media data of the media presentation starting at the resync point; and present the retrieved media data.

29 Claims, 9 Drawing Sheets

(51) Int. Cl.
| | |
|---|---|
| *H04N 21/236* | (2011.01) |
| *H04N 7/54* | (2006.01) |
| *H04L 65/70* | (2022.01) |
| *H04N 21/2343* | (2011.01) |
| *H04N 21/854* | (2011.01) |
| *H04N 21/2365* | (2011.01) |

(52) U.S. Cl.
CPC ............ *H04N 21/2365* (2013.01); *H04N 21/23439* (2013.01); *H04N 21/85406* (2013.01); *H04N 2201/04748* (2013.01)

(58) Field of Classification Search
USPC .......................................................... 375/354
See application file for complete search history.

(56) References Cited

U.S. PATENT DOCUMENTS

| | | | |
|---|---|---|---|
| 2016/0373777 A1 | 12/2016 | Pettersson et al. | |
| 2018/0302640 A1* | 10/2018 | Li | ................ H04N 19/23 |
| 2019/0028523 A1 | 1/2019 | Park et al. | |
| 2019/0124397 A1* | 4/2019 | Takahashi | ................ H04B 1/16 |
| 2020/0021867 A1* | 1/2020 | Park | ................ H04L 9/40 |
| 2020/0162536 A1 | 5/2020 | Vincent | ............... H04L 12/1881 |
| 2020/0404361 A1* | 12/2020 | Lohmar | ............. H04N 21/6373 |
| 2021/0250617 A1* | 8/2021 | Hannuksela | ....... H04N 21/8455 |

FOREIGN PATENT DOCUMENTS

| | | |
|---|---|---|
| WO | 2019011430 A1 | 1/2019 |
| WO | 2019121963 A1 | 6/2019 |

OTHER PUBLICATIONS

International Search Report and Written Opinion—PCT/US2020/054026—ISA/EPO—dated Dec. 3, 2020.

ISO/IEC 14496-12: Information technology—Coding of audio-visual objects—Part 12: ISO base media file format, 5th edition, Dec. 15, 2015, 248 Pages.

ITU-T H.264, Series H: Audiovisual and Multimedia Systems, Infrastructure of Audiovisual Services—Coding of Moving Video, Advanced Video Coding for Generic Audiovisual Services, The International Telecommunication Union. Jun. 2011, 674 Pages.

Jang E-D., et al., "Virtual Segmentation of TS Packetized Video Using Key-Frame Information", Coding of Moving Pictures and Audio, ISO/IEC JTC1/SC29/WG11, MPEG2010/M18415, Guangzhou, China, Oct. 2010, XP30047005A, 4 Pages.

Paila T., et al., "FLUTE—File Delivery Over Unidirectional Transport", FLUTE—File Delivery over Unidirectional Transport, rfc6726.txt, Internet Engineering Task Force (IETF), Standard Track, Internet Society (ISOC) 4, Rue Des Falaises CH—1205 Geneva, Switzerland, Nov. 6, 2012 (Nov. 6, 2012), XP015086468, pp. 1-46, http://tools.ietf.org/html/rfc6726, [retrieved on Nov. 6, 2012], p. 3, line 30—p. 27, line 12.

Qualcomm Incorporated: "[DASH] Random Access to Segments (Resync)", Coding of Moving Pictures and Audio, ISO/IEC JTC1/SC29/WG11 MPEG2019/M50975, Geneva, Switzerland, Oct. 2019, 14 Pages.

Stockhammer T., et al., "[CMAF] Random Access in CMAF Resources", Coding of Moving Pictures and Audio, ISO/IEC JTC1/SC29/WG11 MPEG2019/M50970, Geneva, Switzerland, Oct. 2019, 15 Pages.

* cited by examiner

RANDOM ACCESS AT RESYNC POINTS OF DASH SEGMENTS

This application claims the benefit of U.S. Provisional Application No. 62/909,642, filed Oct. 2, 2019, the entire contents of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for accessing data of a segment in Dynamic Adaptive Streaming over HTTP (DASH) and/or Common Media Access Format (CMAF) not only at the start of the Segment, but elsewhere within the segment (e.g., for random access). This disclosure also describes techniques relating to signaling the ability to perform random access within a segment. This disclosure describes various use cases related to these techniques. For example, this disclosure defines a resynchronization (resync) point and signaling of resync points in DASH and ISO Base Media File Format (BMFF).

In one example, a method of retrieving media data includes retrieving a manifest file for a media presentation indicating that container parsing of media data of a bitstream can be started at a resync point of a segment of a representation of the media presentation, the resync point being at a position other than a start of the segment and representing a point at which the container parsing of the media data of the bitstream can be started; using the manifest file, forming a request to retrieve the media data of the representation starting at the resync point; sending the request to initiate retrieval of the media data of the media presentation starting at the resync point; and presenting the retrieved media data.

In another example, a device for retrieving media data includes a memory configured to store media data of a media presentation; and one or more processors implemented in circuitry and configured to: retrieve a manifest file for a media presentation indicating that container parsing of media data of a bitstream can be started at a resync point of a segment of a representation of the media presentation, the resync point being at a position other than a start of the segment and representing a point at which the container parsing of the media data of the bitstream can be started; use the manifest file to form a request to retrieve the media data of the representation starting at the resync point; send the request to initiate retrieval of the media data of the media presentation starting at the resync point; and present the retrieved media data.

In another example, a computer-readable storage medium has stored thereon instructions that, when executed, cause a processor to retrieve a manifest file for a media presentation indicating that container parsing of media data of a bitstream can be started at a resync point of a segment of a representation of the media presentation, the resync point being at a position other than a start of the segment and representing a point at which the container parsing of the media data of the bitstream can be started; use the manifest file to form a request to retrieve the media data of the representation starting at the resync point; send the request to initiate retrieval of the media data of the media presentation starting at the resync point; and present the retrieved media data.

In another example, a device for retrieving media data includes means for retrieving a manifest file for a media presentation indicating that container parsing of media data of a bitstream can be started at a resync point of a segment of a representation of the media presentation, the resync point being at a position other than a start of the segment and representing a point at which the container parsing of the media data of the bitstream can be started; means for using the manifest file, forming a request to retrieve the media data of the representation starting at the resync point; means for sending the request to initiate retrieval of the media data of the media presentation starting at the resync point; and means for presenting the retrieved media data.

The details of one or more examples are set forth in the accompanying drawings and the description below. Other features, objects, and advantages will be apparent from the description and drawings, and from the claims.

DETAILED DESCRIPTION

Figure 1:
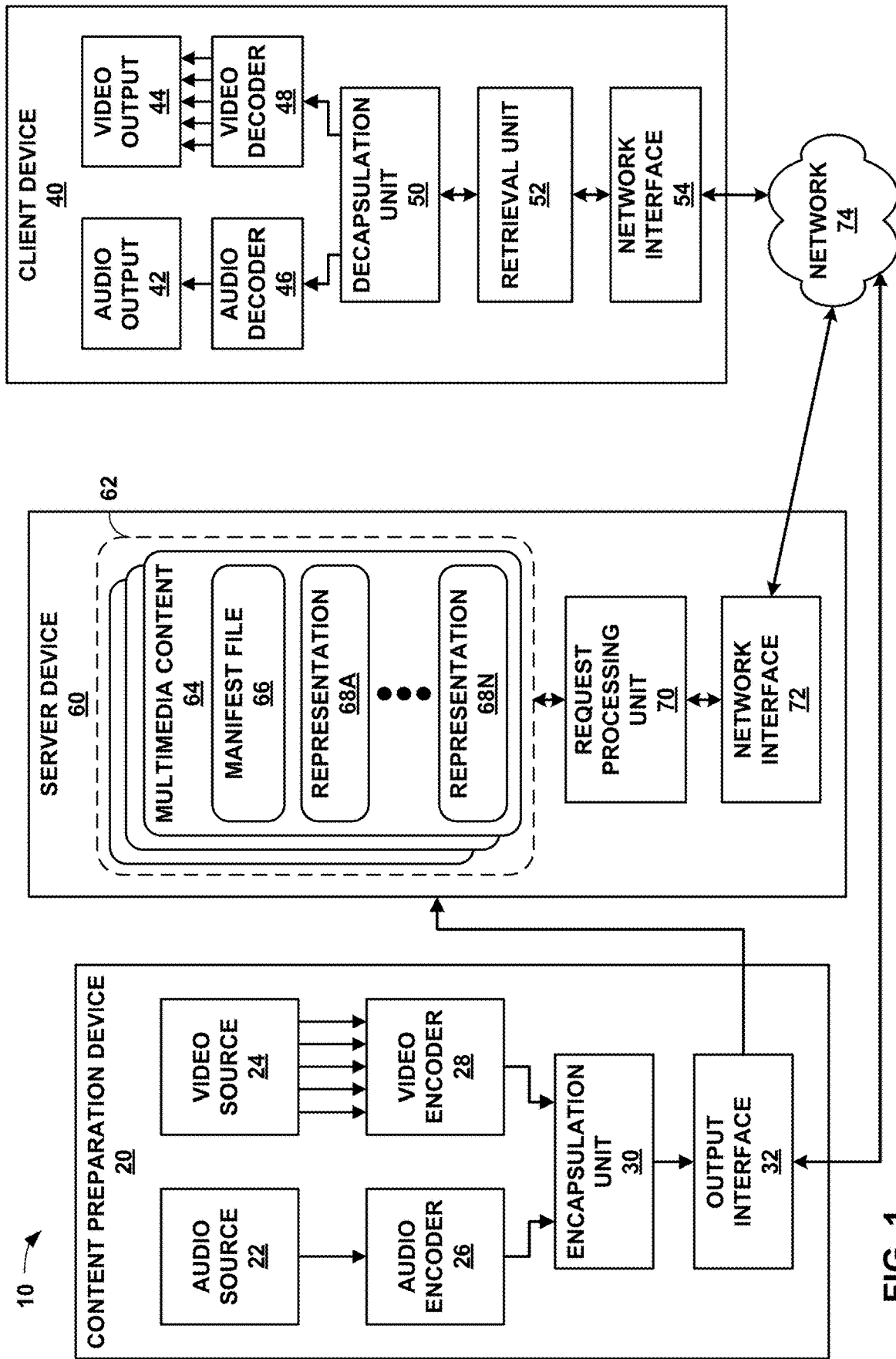
FIG. 1 is a block diagram illustrating an example system that implements techniques for streaming media data over a network.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

Low-latency Dynamic Adaptive Streaming over HTTP (LL-DASH) is a profile for DASH that attempts to provide media data to a DASH client with low latency. Certain technologies for LL-DASH are briefly summarized below:
  The encoding is based on fragmented ISO BMFF files and typically CMAF Fragments and CMAF chunks are assumed.
  Each chunk is individually accessible by the DASH packager and gets mapped to an HTTP chunk that is uploaded to an origin server. This 1-to-1 mapping is a recommendation for low-latency operation, but not a requirement. By no means should the client assume that this 1-to-1 mapping is preserved to the client.
  A low delay protocol, e.g., HTTP Chunked Transfer Encoding, of partially available Segments is used such that clients can access the Segments before they are completed. The availability start time is adjusted for clients that are able to make use of this feature.
  Two operation modes are permitted:
    Simple live offering is used by applying @duration signaling and $Number$ based templating Main live offering with the SegmentTimeline as either $Number$ or $Time$ is supported by the proposed updates in DASH fourth edition.

MPD validity expiration events may be used, but are not essential to be understood by the clients.

Generally, in-band event messages may be present, but clients are only expected to recover those at the start of Segments, not at arbitrary chunks. DASH packagers may receive notifications from the encoder at chunk boundaries or completely asynchronously using timed metadata tracks.

It is permitted in a single Media Presentation and within one Period of a Media Presentation to have Adaptation Sets that are using the chunked low-latency mode and Adaptation Sets using short segments for different media types.

A certain amount of playback control of DASH client on the media pipeline may be available and should be used for robustness of DASH clients. For example, the playback may be accelerated or decelerated for some period of time, or the DASH client may perform a seek into Segments.

The system is designed to be workable with standard HTTP/1.1, but also should be applicable to HTTP extensions and other protocols for improved low-latency operation.

The MPD includes explicit signaling on the service configuration as well as the service properties (for example, including the target latency of the service).

MPDs and possibly also Segments include anchor times that allow DASH clients to measure the current latency compared to live and adjust to meet the service expectations.

Operational robustness is addressed, for example, in case of encoder failures.

Existing DRM and encryption modes are compatible with proposed low-latency operation.

Based on the above high-level overview, the following is defined: The Segments may be used to randomly access the Representation not only at the Segment boundary, but also within the Segment. If such Random Access is provided, this should be signaled in the MPD.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

According to the techniques of this disclosure, content preparation device 20 and/or server device 60 may add additional random access points in DASH/CMAF segments. Random access includes clean random access as well as open or gradual decoder refresh, all the way to only providing a resync on file format parsing. This may be addressed by providing a chunk boundary that provides information that resync and decryption can be started at this point, as well as a signaling on the type of the following random access point. The availability of the tfdt, together with moof header information and potentially the use of the Initialization Segment, allows time resynchronization on presentation time level. This disclosure refers to this new point as a "resync point." That is, the resync point represents a point at which file-level containers (e.g., boxes in ISO BMFF) can be properly parsed, and following which a random access point in media data (e.g., an I-frame) will occur. Thus, client device 40 may randomly access multimedia content 64, for example, at one of these random access points.

Content preparation device 20 and/or server device 60 may also add appropriate signaling in manifest file 66 (e.g., an MPD) that indicates the availability of random access points and resync in each DASH Segment, as well as provides information on the location, type, and timing of the random access point. Content preparation device 20 and/or server device 60 may provide signaling in manifest file 66 (MPD) that indicates that additional resync points are available in the Segment, possibly adding characteristics on the position, timing, type of random access, as well as whether the information is accurate or an estimation. Thus, client device 40 may use this signaled data to determine whether such random access points are available and resynchronize retrieval and playback accordingly.

Client device 40 may be configured with the ability to resynchronize to decapsulation, decryption, and decoding, in case of an arbitrary start point, by finding a resync point. Content preparation device 20 and/or server device 60 may provide a proper chunk that fulfills the above requirements as addressed in the CMAF TUC. Different types may be defined later.

Client device 40 may be configured to start processing in restricted receiver environments, as, for example, available in HTML-5/MSE based playback. This issue may be addressed through a receiver implementation. However, it would be suitable to provide the resync trigger and information to the receiver pipeline with the ability to get a map of resync points in the data structure, the timing and type, and it allows the user of the decoding pipeline to initialize the playback at the random access point.

In addition, a signaling in manifest file 66 may be provided that is backward-compatible. Client devices not configured with the ability to parse the signaling may ignore the signaling and perform methods as discussed above. In addition, manifest file 66 may include a signaling that relates the position to the value of the @bandwidth in order to enable signaling on Adaptation Set level.

Figure 2:
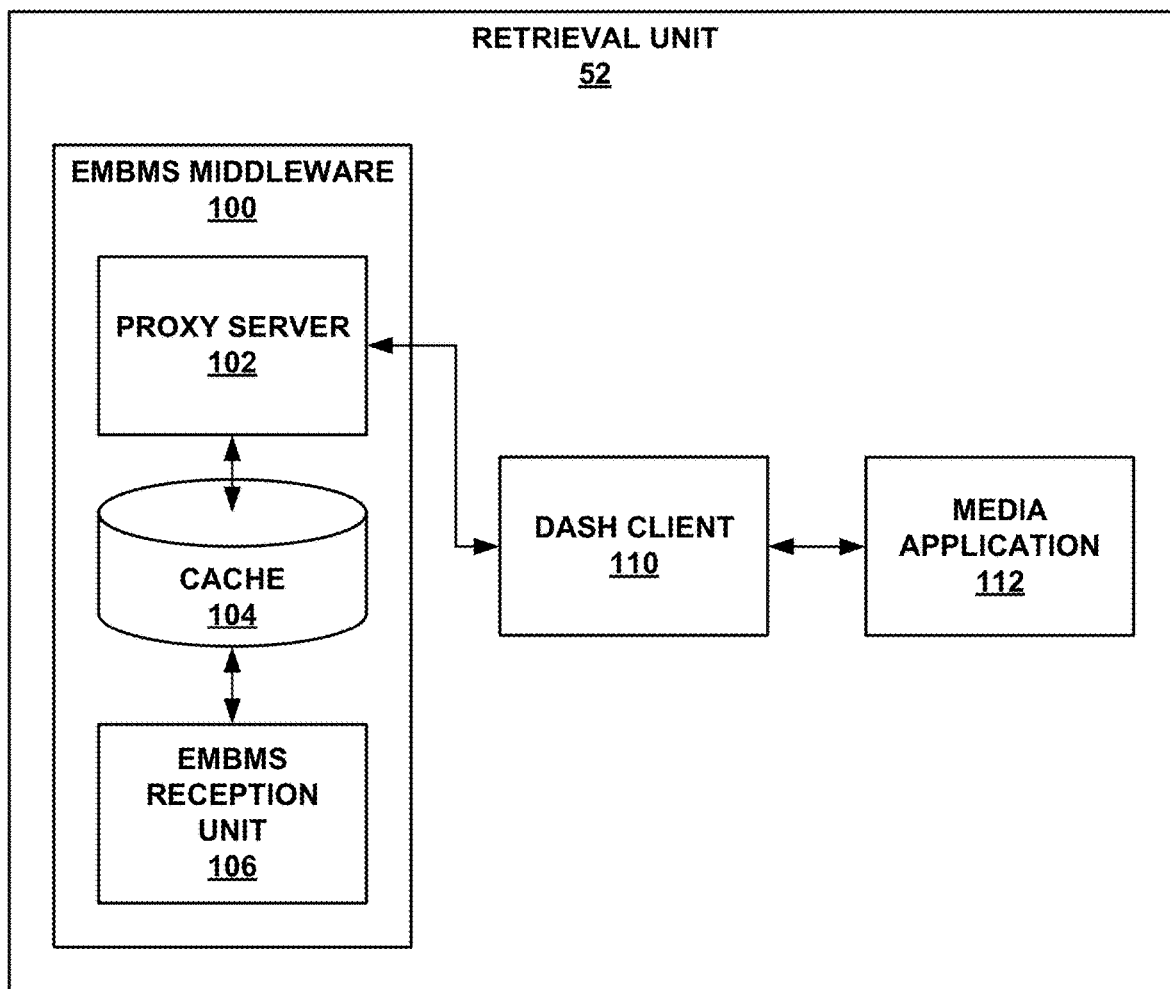
FIG. 2 is a block diagram illustrating an example set of components of a retrieval unit.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

Figure 3:
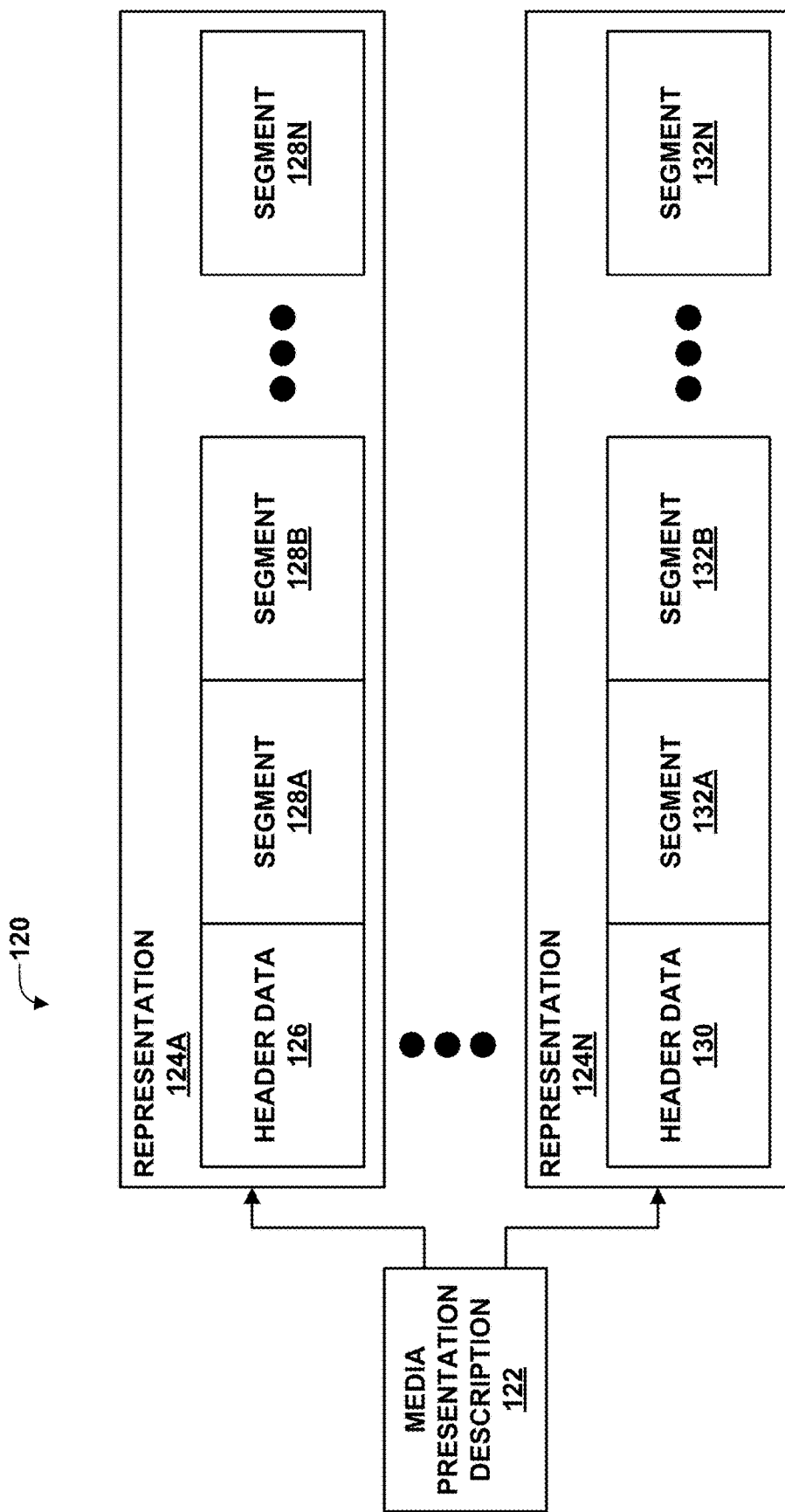
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

In accordance with the techniques of this disclosure, MPD 122 (which again, may correspond to manifest file 66 of FIG. 1) may include signaling to address issues discussed above. For example, for each of representations 124 (and possibly defaulted on Adaptation Set level), MPD 122 may include one or multiple Resync elements (which may enable backward compatibility). Each Resync element may indicate that, for each of segments 128, 132 in the corresponding one of representations 124, the following holds:

Resync points of stream access point (SAP) type @type or smaller (but greater than 0) exist in each Segment with maximum deltaT signaled by @dT and a maximum byte offset difference signaled by @dImax and the minimum byte offset difference signaled by @dImin, where both of these values need to be multiplied by the value of the @bandwidth attribute assigned to this Representation to obtain the value. "deltaT" refers to the difference of the earliest presentation time of any data following the Resync point in units of the @timescale of the Representation. If the @type is set to 0, then only resync on container and decryption level is guaranteed.

A resync marker flag @marker may be set to indicate that the resync point is included at every resync point using a resynchronization pattern as defined by the Segment format in use.

Multiple Resync elements may be present for different SAP types.

Resync points require that processing of the media can happen on ISO BMFF and decryption information in combination with the CMAF Header/Initialization Segment.

Example usage of the Resync point is described with respect to FIG. 8 below.

For any of segments 128, 132 for which a resync element is provided in MPD 122 and the segment is based on the ISO BMFF or CMAF, the following may hold:

The Segment may be a sequence of one or multiple Chunks as defined below.

In addition, for any two consecutive Resync Points in the Segment of the @type specified in the element, the following may hold The difference of the earliest presentation time of the two may at most be the value of @dT.

The difference of the byte offset from start may at most be @dImax normalized with the @bandwidth value.

The difference of the byte offset from start may at least be @dImin normalized with the @bandwidth value If the resync marker flag is set, then each resync point may include the resync box/styp.

Figure 4:
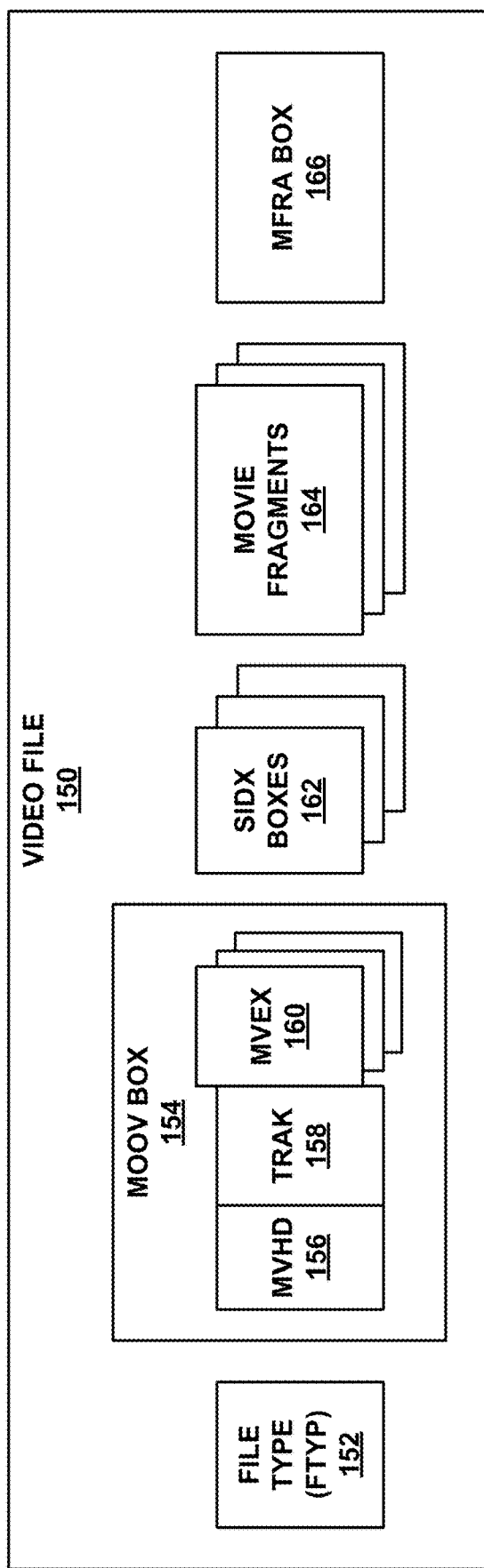
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

In one example, this disclosure defines a "chunk" as follows in the table below. The table provides an example definition of both cardinality and ordinality of the chunk:

| NL 0 | Cardinality | Specification | Constraints | Description |
|---|---|---|---|---|
| styp | 0/1 | ISO/IEC 14496-12 | DASH/CMAF constraints | Segment Type Signalling compatibility to CMAF Chunk |
| prft | 0/1 | ISO/IEC 14496-12 | DASH/CMAF constraints | Producer Reference Time |
| emsg | * | ISO/IEC 23009-1 | DASH/CMAF constraints | Event Message |
| moof | 1 | ISO/IEC 14496-12 | DASH/CMAF constraints | Movie Fragment box and the boxes it contains |
| mdat | 1 | ISO/IEC 14496-12 | DASH/CMAF constraints | Media Data container for media samples |

In one example, this disclosure defines a resync point as the start of a chunk. In addition, a resync point may be assigned the following properties:

It has a byte offset from the start of the Segment, pointing to a first byte of the chunk.

It has an earliest presentation time, derived from the information in the moof and possibly the movie header assigned to it.

It has a SAP type assigned to it, as defined in ISO/IEC 14496-12.

There is an indication of whether the chunk contains a resync box (styp in the above).

Starting from a resync point, together with the information in the movie header, file format parsing and decryption can be done.

In some examples, a resync marker box may be defined that enables sync to the start of a Segment (e.g., video file 150) by scanning the byte stream for a marker. This resync box may have the following properties:

It defines a unique pattern for resync with a very high likelihood.

It defines the SAP type.

The resync marker box may be a new box or it may re-use an existing box, such as the styp box. In this disclosure, it is assumed that the styp with a specific restriction can be used as resync marker box. Studies are ongoing on the robustness of this approach.

Figure 5:
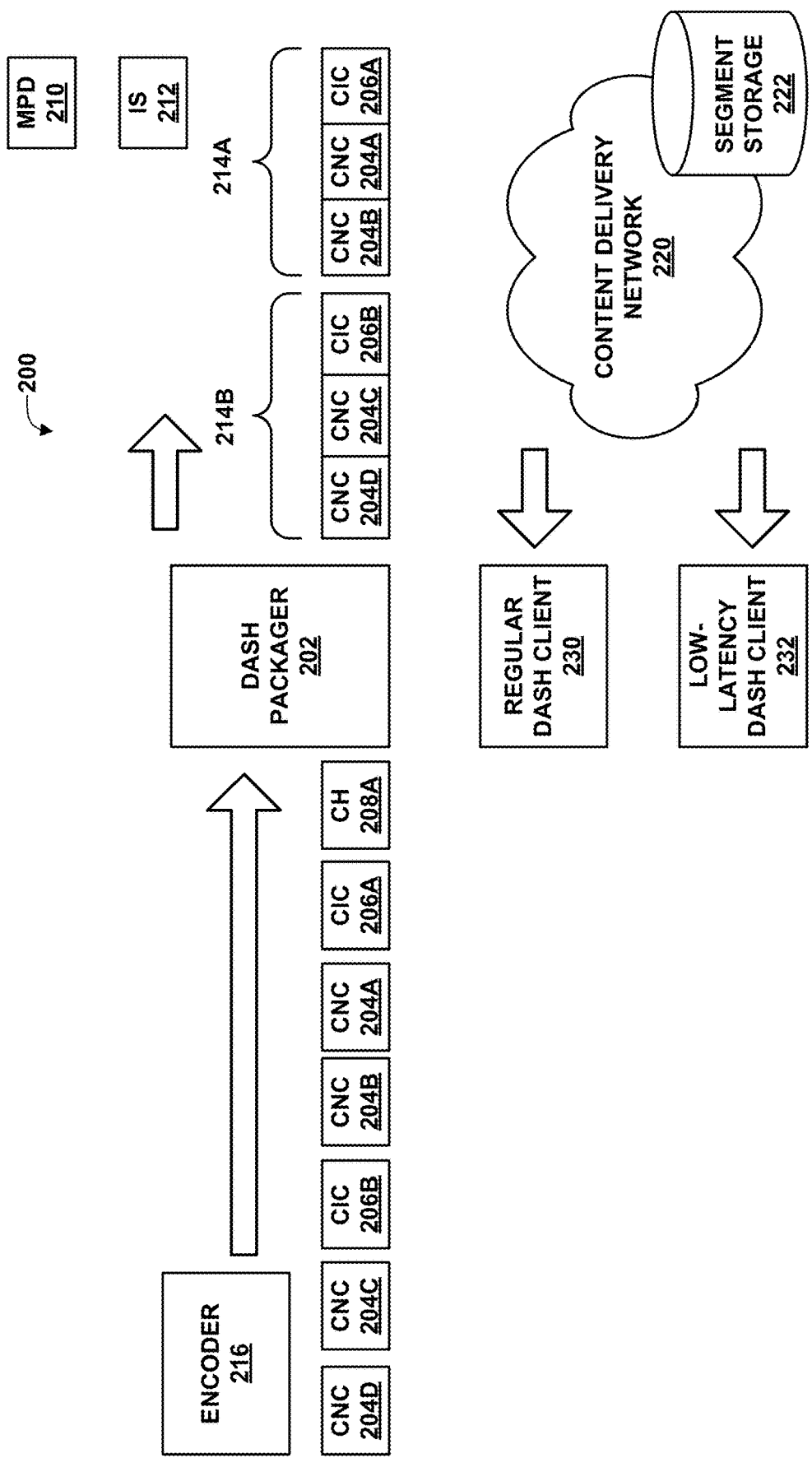
FIG. 5 is a conceptual diagram illustrating an example low latency architecture that may be used in a first use case according to this disclosure.
Figure 6:
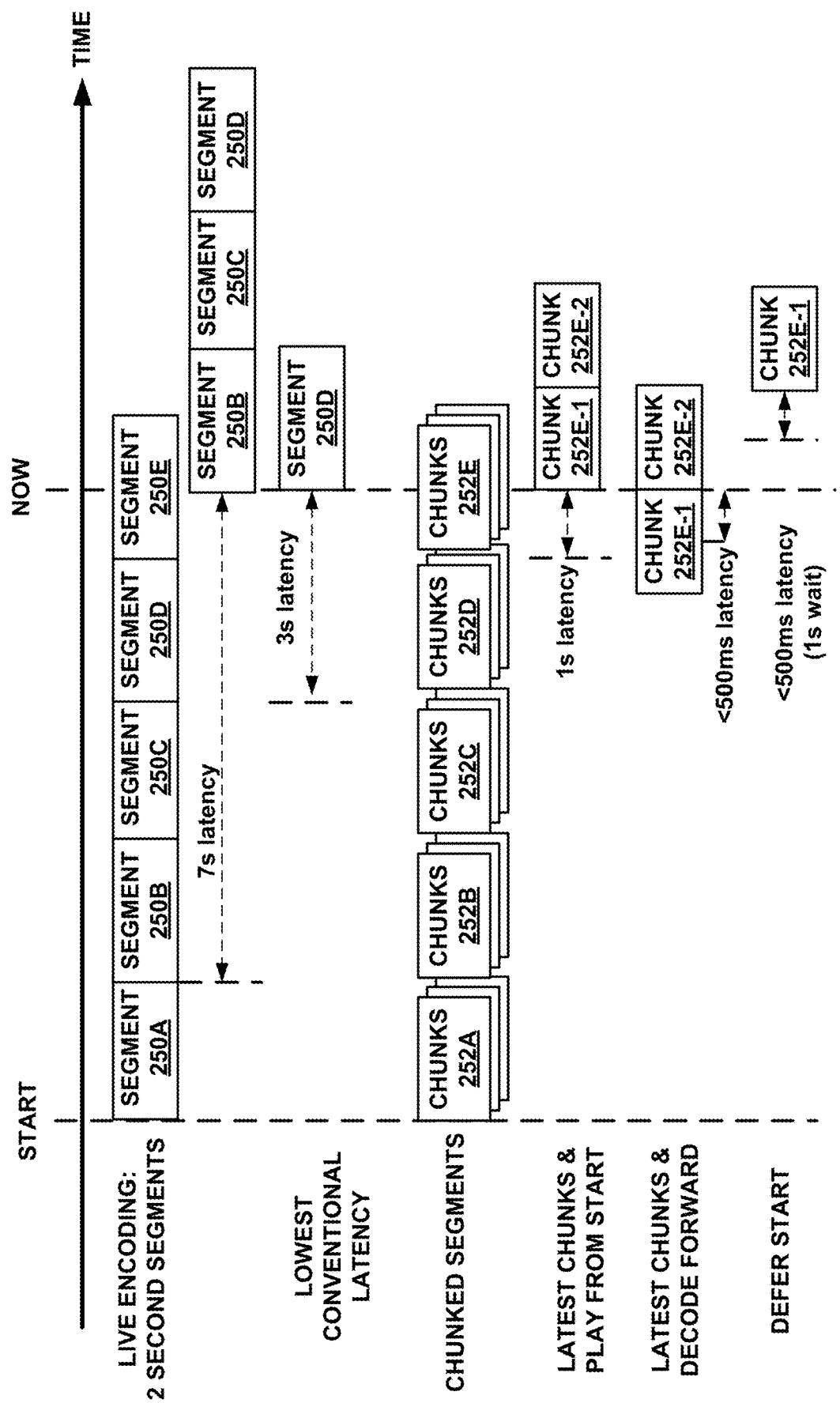
FIG. 6 is a conceptual diagram illustrating an example of the use case described with respect to FIG. 5 in further detail.
Figure 7:
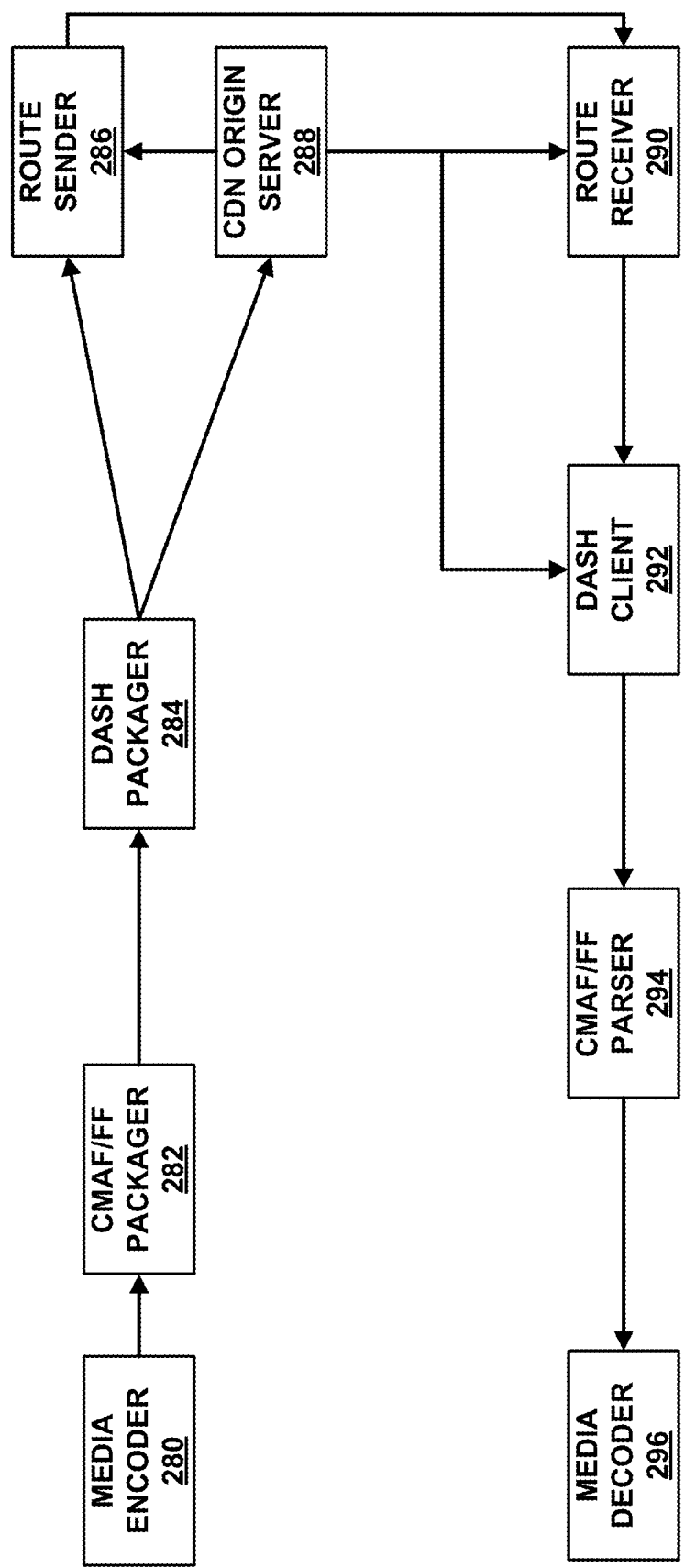
FIG. 7 is a conceptual diagram illustrating an example second use case of using DASH and CMAF random access in the context of a broadcast protocol.

FIGS. 5-7 below are used to describe several use cases for which random access to DASH segments at points other than starts of the segments may be useful.

FIG. 5 is a conceptual diagram illustrating an example low latency architecture 200 that may be used in a first use case according to this disclosure. That is, FIG. 5 illustrates a basic flow of information for operating a low-latency DASH service according to DASH-IF IOPs. Low latency architecture 200 includes DASH packager 202, encoder 216, content delivery network (CDN) 200, regular DASH client 230, and low-latency DASH client 232. Encoder 216 may generally correspond to either or both of audio encoder 26 and video encoder 28 of FIG. 1, while DASH packager 202 may correspond to encapsulation unit 30 of FIG. 1.

In this example, encoder 216 encodes received media data to form CMAF headers (CH) such as CH 208, CMAF initial chunks 206A, 206B (CIC 206), and CMAF non-initial chunks 204A-204D (CNC 204). Encoder 216 provides CH 208, CIC 206, and CNC 204 to DASH packager 202. DASH packager 202 also receives a service description, which includes information on the general description of the service and an encoder configuration of encoder 216.

DASH packager 202 uses the service description, CH 208, CIC 206, and CNC 204 to form media presentation description (MPD) 210 and initialization segment 212. DASH packager 202 also produces maps CH 208, CIC 206, and CNC 204 into segments 214A, 214B (segments 214) and provides segments 214 to CDN 220 in an incremental fashion. DASH packager 202 may deliver segments 214 in the form of chunks as they are generated. CDN 220 includes segment storage 222 for storing MPD 210, IS 212, and segments 214. CDN 220 delivers full segments to regular DASH client 230, but individual chunks (e.g., CH 208, CIC 206, and CNC 204) to low-latency DASH client 232, e.g., in response to HTTP Get or partial Get requests from regular DASH client 230 and low-latency DASH client 232.

FIG. 6 is a conceptual diagram illustrating an example of the use case described with respect to FIG. 5 in further detail. The example of FIG. 6 illustrates segments 250A-250E (segments 250), which include respective sets of chunks 252A-252E (chunks 252). A client device, such as client device 40 of FIG. 1, may retrieve either full segments 250 or individual chunks 252. For example, as shown in FIG. 5, regular DASH client 230 may retrieve segments 250, whereas low-latency DASH client 232 may retrieve individual chunks 252 (at least initially).

FIG. 6 further depicts how latency can be reduced by retrieving individual chunks 252, instead of full segments 250. For example, retrieving full segments at a current time may cause higher latencies. Simply retrieving a most recent, fully available segment may reduce the latency, but still give rise to a relatively high latency.

By retrieving chunks instead, these latencies can be drastically reduced. For example, at a current time as indicated by "now" in FIG. 6, segment 250E is not fully formed. Nevertheless, a client device may retrieve formed chunks, such as chunks 252E-1 and 252E-2 of segment 250E, even before segment 250E is fully formed, assuming chunks 252E-1 and 252E-2 are formed and available for retrieval.

When joining the live stream, typically both low latency and fast startup should be achieved. However, this is non-trivial and a few strategies are discussed below based on FIG. 6:

In the first case, at the live edge, segments that are in the time history 3 segments behind (i.e., segments 250B, 250C, and 250D) are loaded into the buffer. Once one segment is available, playback starts. This results in significant latency, but playback may start relatively quickly, as a random access at the start of a segment is loaded.

In the second case, the latest available segment, segment 250D, is selected, instead of a three segment old segment. The playback latency in this case is at least the segment duration, but may be higher. Startup is probably similar, as in the case above.

In the other three cases, a segment including multiple chunks (e.g., segment 250E) is played back while still being produced. This reduces latency, but there exists an issue that start of playback may suffer, especially if the difference of segment availability start time of the latest published segment and the wall-clock time is larger than the target latency. In this case, the client device may have to wait until the next second is published. In case of 6 second segments, this may result in 4-5 seconds of start-up latency.

Other techniques and use cases exist. For example, a client may access the old segment at the start, download everything, and accelerate the playback and do fast forward decoding. However, such an approach has the downside that significant data needs to be downloaded before the accelerated decoding can happen. Furthermore, it is not broadly supported in decoder interfaces. A suitable solution may be that:

At least one representation of an adaptation set contains more frequent random access points and non-initial chunks in a segment/fragment.

The DASH client may determine that such a random access method exists using information from the MPD, but location/byte offset of the random access point may not be signaled exactly.

The DASH client may access this representation at startup, but only download starting from the byte range of a latest available non-initial chunk, or at least close to it.

Once downloaded, the DASH client may determine the random access point and start processing the data together with the also downloaded initialization segment/CMAF header of the same representation. Localization of random access points is discussed below.

However, the latter approach may encounter various issues, as summarized below.

Thus, as shown in the examples of FIG. 6 and as discussed below, use of chunks as discussed in this disclosure may reduce latency substantially. Signaling the beginning of a chunk in advance may allow a manifest file to be produced ahead of time that does not require frequent updates, but that can still indicate the general location of stream access points (SAPs) within chunks. In this manner, a client device can determine the locations of chunk boundaries using the manifest file, without the need for continuous manifest file updates, and while still allowing the client device to initiate media streaming at the beginning of a chunk boundary, e.g., a resync point. That is, the client device may determine a byte range of a segment including a resync point, even before the segment has been fully formed, from the manifest file, because the manifest file may signal the byte range or other data representative of a general location of the resync point in the segment.

FIG. 7 is a conceptual diagram illustrating an example second use case of using DASH and CMAF random access in the context of a broadcast protocol. FIG. 7 illustrates an example including media encoder 280, CMAF/file format (FF) packager 282, DASH packager 284, ROUTE sender 286, CDN origin server 288, ROUTE receiver 290, DASH client 292, CMAF/FF parser 294, and media decoder 296. Media encoder 280 encodes media data, such as audio or video data. Media encoder 280 may correspond to audio encoder 26 or video encoder 28 of FIG. 1, or encoder 216 of FIG. 5. Media encoder 280 provides encoded media data to CMAF/FF packager 282, which formats the encoded media data into files according to CMAF and a particular file format, such as ISO BMFF or an extension thereof.

CMAF/FF packager 282 provides these files (e.g., chunks) to DASH packager 284, which aggregates the files/chunks into DASH segments. DASH packager 284 may also form a manifest file, such as an MPD, including data describing the files/chunks/segments. In addition, according to the techniques of this disclosure, DASH packager 284 may determine an approximate location of a future stream access point (SAP) or random access point (RAP), and signal the approximate location in the MPD. CMAF/FF packager 282 and DASH packager 284 may correspond to encapsulation unit 30 of FIG. 1 or DASH packager 202 of FIG. 5.

DASH packager 284 provides the segments to ROUTE sender 286 and to CDN origin server 288, along with the MPD. ROUTE sender 286 and CDN origin server 288 may correspond to server device 60 of FIG. 1 or CDN 220 of FIG. 5. In general, ROUTE sender 286 may send media data to ROUTE receiver 290 according to ROUTE, in this example. In other examples, other file-based delivery protocols may be used for broadcast or multicast, such as FLUTE. Additionally or alternatively, CDN origin server 288 may send the media data to ROUTE receiver 290 and/or directly to DASH client 292, e.g., according to HTTP.

ROUTE receiver 290 may be implemented in middleware, such as eMBMS middleware unit 100 of FIG. 2. ROUTE receiver 290 may buffer received media data, e.g., in cache 104 as shown in FIG. 2. DASH client 292 (which may correspond to DASH client 110 of FIG. 2) may retrieve the cached media data from ROUTE receiver 290 using HTTP. Alternatively, DASH client 292 may retrieve media data directly from CDN origin server 288, according to HTTP, as discussed above.

Furthermore, in accordance with the techniques of this disclosure, DASH client 292 may use a manifest file, such as an MPD, to determine a location of a SAP or RAP, e.g., following a resync point signaled in the manifest file. DASH client 292 may initiate retrieval of a media presentation starting from a next soonest resync point. The resync point may generally indicate a location of the bitstream at which file-container level data can be correctly parsed. Thus, DASH client 292 may initiate streaming starting at the resync point and deliver received media data starting from the resync point to CMAF/FF parser 294.

CMAF/FF parser 294 may begin parsing of the media data starting from the resync point. CMAF/FF parser 294 may correspond to decapsulation unit 50 of FIG. 1. Furthermore, CMAF/FF parser 294 may extract decodable media data from the parsed data and deliver the decodable media data to media decoder 296, which may correspond to audio decoder 46 or video decoder 48 of FIG. 1. Media decoder 296 may decode the media data and deliver the decoded media data to a corresponding output device, such as audio output 42 or video output 44 of FIG. 1.

In the case of broadcast, an example for combination of DASH/CMAF and ROUTE is shown in FIG. 7. In combination of the low-latency DASH mode with ROUTE (as, for example, considered for DVB TM-IPI taskforce on ABR multicast, as well as for an ATSC profile), the following issues may arise. If ROUTE receiver 290 joins in the middle of a DASH/CMAF low latency segment, it cannot start processing the data, as no synchronization is available, nor does any random access for other purposes exist. Hence, start-up is delayed, even if more frequent random access would be provided in the middle of a segment.

A suitable solution may be that:

The broadcast/multicast representation contains more frequent random access points and non-initial chunks in a Segment/Fragment.

DASH client 292 determines that such a random access method exists using information of the MPD, and/or possibly by information from ROUTE receiver 290. DASH client 292 may locate the random access point exactly using such information, but possibly not.

DASH client 292 may access this representation at startup, but may not have access to all information from the start.

Once starting to access the received part of the segment, DASH client 292 may find the random access point and start processing the data together with the also downloaded Initialization Segment/CMAF Header of the same Representation. Localization of a random access point is discussed below.

However, the latter approach may encounter various issues as summarized below.

In a similar case as discussed in the second use case above, a loss of a packet may also be problematic, not only at random access resync. In this example third use case, similar procedures as discussed above may apply. Beyond this, it may even be the case that not only a clean random access is attempted, but after sufficient box parsing was possible, an event at non-random access chunks (e.g. no IDR frame), decoding and presentation may be attempted. Hence, not only resync to clean random access matters, but also to random access to file format parsing.

Yet another fourth use case may occur if, typically, live media content is distributed in low latency, but then the same media content is used in time shift for delayed playback. A client may want to access the media presentation at a specific time, but this time may not (and typically will not) coincide with a Segment/CMAF Fragment start.

A suitable solution may be that:
At least one representation of an adaptation set may contain more frequent random access points and non-initial chunks in a Segment/Fragment.
DASH client 292 may determine that such a random access method exists using information from the MPD, but location/byte offset of the random access point may not be known exactly.
DASH client 292 may access this Representation at seek, but only downloads starting from the byte range of a latest available non-initial chunk, or at least close to it, may be permitted.
Once downloaded, DASH client 292 may find the random access point and start processing the data together with the also downloaded Initialization Segment/CMAF Header of the same Representation. Localization of a random access point is discussed below.

However, the latter approach may encounter various issues as summarized below.

Resynchronization in the case of ISO BMFF/DASH/CMAF segments generally involves multiple processes as summarized below:
1) Finding the box structure.
2) Finding a CMAF chunk/fragment with all relevant information.
3) Finding the timing through mdat and tfdt.
4) Obtaining all decryption relevant information, if applicable.
5) Possibly processing event messages.
6) Start decoding on elementary stream level.

Example ways of finding a resync point in a box structure at a specific time are summarized below:
If there is a segment index (SIDX box), then such resync points are provided as presentation times and byte offsets. However, a segment index is typically not available for low latency live, as the segments are not fully formed in advance.
If the start of the segment is available, the client may download a minimum set of byte ranges, such that the box structure can be processed.
Resync is provided by the underlying protocol, that for example provides the boundary of a chunk is signaled and the client can start parsing.

If the start of the segment is not capable of being determined readily through signaled data, the client may find a sync pattern that allows the client to randomly access the data. Then the client may start parsing and find the proper box structure that allows processing, such as, for example, emsg, prft, mdat, moof, and/or mdat.

This disclosure describes techniques that may apply to the fourth example above. The first three represent example simplifications in case the corresponding information is available.

This disclosure recognizes the following issues based on the discussion above and that these issues require a solution:
1) Adding additional random access points in DASH/CMAF segments. Random access may include clean random access as well as open or gradual decoder refresh, all the way to only providing a resync on file format parsing.
2) Adding appropriate signaling in the MPD (or other manifest file) that indicates the availability of random access points and resync in each DASH segment, as well as that provides information on the location, type, and timing of the random access point. The information may be precise or may be within a range.
3) The ability to resynchronize to decapsulation, decryption, and decoding, in case of an arbitrary start point by finding a resync point.
4) The ability to start processing in restricted receiver environments as, for example, available in HTML-5/MSE based playback.

Figure 8:
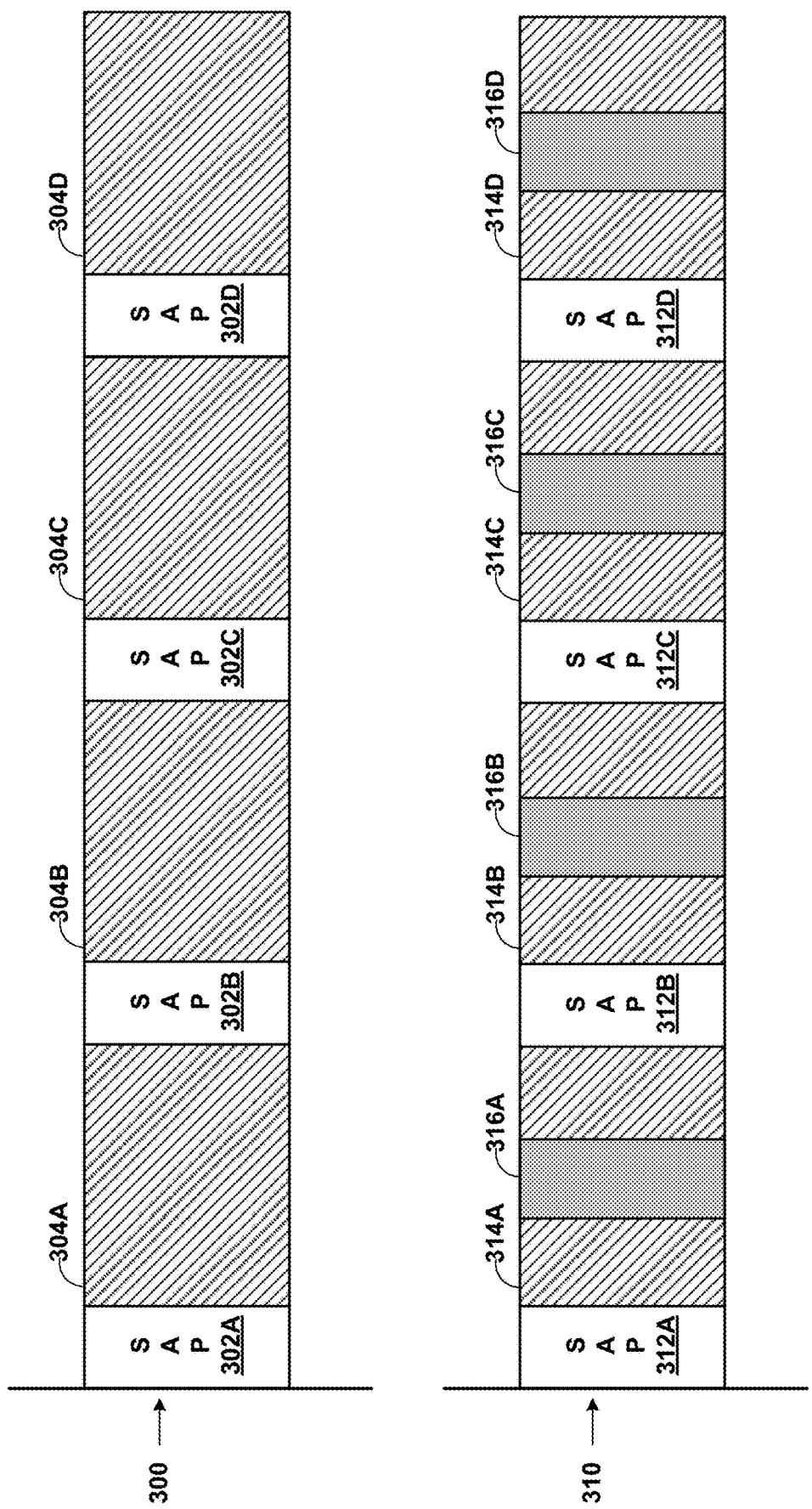
FIG. 8 is a conceptual diagram illustrating example signaling of stream access points (SAPs) in a manifest file.

FIG. 8 is a conceptual diagram illustrating example signaling of stream access points (SAPs) in a manifest file. In particular, FIG. 8 illustrates bitstream 300 including SAPs 302A-302D (SAPs 302) and segments 304A-304D (segments 304), as well as bitstream 310 including SAPs 312A-312D (SAPs 312), SAPs 316A-316D (SAPs 316), and segments 314A-314D (segments 314). That is, in this example, segments 314 of bitstream 310 include more frequent SAPs 312, 316 than segments 304 of bitstream 300. Each of SAPs 302, 312 may correspond to the start of both a corresponding one of segments 304, 314, as well as to a first chunk of these segments. SAPs 316 may correspond to the start of a chunk within, but not at the beginning of, corresponding segments 316.

To provide a simple technique for achieving a constant bitrate representation with chunks in equidistance of 1000 samples (and @timescale=1000 in sample duration) and SAP type 1 (this may for example be an audio Representation), a Resync element may be added with:
@type=1
@dT=1000
@dImin=100
@dImax=100

A client, e.g., client device 40 of FIG. 1, receiving such information may not be able to identify, for a segment of @duration=10000, that a random access point can be accessed every second at an exact byte range. If the bitrate is variable, the receiver (e.g., client device 40) can use @dIMin and @dIMax to identify a range in which to find a random access point. As an alternative to @dT signaling the max, it may also signal a nominal chunk duration.

The resync element of a manifest file may also include a URL @index pointing to a binary Resync Index of the Resync Point in each Segment, using the same template function as for regular Segments. If present, this Resync may provide the accurate position of all Resync Points in the Segment, in a similar fashion as the Segment Index. If this index is present, then the resync index may be available for all Segments of the Period that are available at the publish Time of the manifest file/MPD.

In one approach, the resync index may be identical to the segment index, but may be changed.

Client device 40 of FIG. 1 may use the ISO BMFF 4-character box type as the basis to resync into a media file (e.g., video file 150 of FIG. 4, which may be a segment). In one example, the selected box type is the "styp" box, but it could be also the "moof" box itself. The random emulation of the box string type is extremely rare. A test report of styp emulation is described below. This emulation is then avoided by checking against the known expected box types. Client device 40 may perform a resync mechanism outlined as follows:

1) Find an occurrence of the "styp" byte string in a segment, e.g., at byte offset B1.
2) Verify against a random emulation as follows: the next box type is compared against the list of expected box types: 'styp', 'sidx', 'ssix', 'prft', 'moof', 'mdat', 'free', 'mfra', 'skip', 'meta', 'meco'.
   a. If one of the known box types is found, Byte offset B1-4 bytes is the byte offset of the resync point.
   b. If this is not one of the known box types noted before, this occurrence of styp box is considered an invalid sync point and ignored. Restart from step 1 above.

The techniques of this disclosure were tested on 30,282 segments from DASH-IF test assets that were scanned. This scan revealed 28,408 occurrences of the "styp" string in the files, and only 10 of these 28,408 occurrences (roughly 1 in 2840 occurrences) were emulations which were discarded once it was determined that the following box is not one of the expected box types: 'styp', 'sidx', 'ssix', 'prft', 'moof', 'mdat', 'free', 'mfra', 'skip', 'meta', 'meco'.

Based on these results, it is considered that the use of styp Resync Point detection, together with the chunk structure, is sufficient. It would be suitable to restrict to only a subset of boxes, that may follow the styp, such as prft, emsg, free, skip, and moof.

A remaining issue is the determination of the SAP type and the earliest presentation time. The latter is easily accomplished by the use of the tfdt and other information in the movie fragment header. It would be suitable to document the algorithm.

There are several options for determining the SAP type as described below:

A detection based on the information in the moof. A simple technique could be documented and performed.
The use of compatibility brands for SAP types. Already through the use of the CMAF, the following can be deduced:
   cmff: indicates that the SAP is 1 or 2
   cmfl: indicates that the SAP is 0 (is this correct for decryption?)
   cmfr: indicates that the SAP is 1, 2 or 3
If consistently used, this signalling may be sufficient. Compatibility brands for other SAP types may be defined.
Other techniques may be used to indicate the SAP type.
Existing options may be used to determine the SAP type.

In this manner, the techniques of this disclosure may be summarized as follows, and may be performed by devices such as content preparation device 20, server device 60, and/or client device 40 of FIG. 1, as discussed above:

In the DASH context, in certain cases, Segments are treated as a single unit for download, access to the Media Presentation, and also by the addressed URL. However, Segments may be structured to enable resynchronization on container level and random access to the respective Representation even within a Segment. The resynchronization mechanism is supported and signaled by the Resync element.

The resync element signals Resync Points in Segments. A resync point is the start (in byte position) of a chunk, where a chunk is defined as a structured continuous byte range within a Segment that contains media data of a certain presentation duration and can be accessed independently on container format including potential decryption. A resync point in a Segment may be defined as follows:

A resync point is the start of a chunk.
In addition, a resync point has assigned the following properties:
   It has a byte offset or index value from the start of the segment, pointing to a first byte of the chunk.
   It has an assigned earliest presentation time in the Representation
   It has an assigned SAP type, for example defined by the SAP type in ISO/IEC 14496-12.
   It has assigned a marker property indicating whether the resync point can be detected while parsing a segment through a specific marker or if the resync point needs to be signaled by external means.
Starting processing from a resync point, together with the information in the Initialization Segment, if present, allows container parsing and decryption. The ability of whether and how to access the contained elementary video stream is defined by the SAP type.

Signaling each resync point in the MPD may be difficult for causality reasons, as resync points may be added by the segment packager independently of MPD updates. For example, a resync point may be generated by the encoder and packager independently of the MPD. Also, in low-latency cases, the MPD signaling may not be available to the DASH client, e.g., DASH client 110 of FIG. 2 or DASH client 292 of FIG. 7. Hence, there are two ways to signal resync points provided in a segment in an MPD:

By providing a binary map for the resync points in a resync index segment for each segment. This is most easily used for segments that are fully available on the network.
By signalling the existence of resync points in the segment and also some additional information that permits to easily locate the resync point in terms of the byte position and the presentation time.

In order to signal the above properties, a resync element has different attributes, that are explained in more details in clause 5.3.12.2 of the DASH specification.

Random access refers to start processing, decoding and presenting a representation from a random access point at time t onwards by initializing the representation with an initialization segment, if present, and decoding and presenting the representation from the signalled segment onwards. Random Access point may be signalled with a RandomAccess element, as defined in Table 10 below.

TABLE 10

Random Access Signalling

| Element or Attribute Name | Use | Description |
|---|---|---|
| ResyncPoint @type | OD default: "0" | Resync Point signalling if greater than 0, specifies that one or multiple Resync Point are present in the Segment with SAP type being equal or |

TABLE 10-continued

Random Access Signalling

| Element or Attribute Name | Use | Description |
|---|---|---|
| | | smaller than the one indicated in the value. if 0, specifies that Resync Points are present in the Segment with any SAP type. For details on SAP types, refer to clause 4.5.2 of DASH. |
| @dT | O | specifies the maximum difference of the Time value of any two consecutive Resync Points that are included in the @type definition above in any Media Segment for this Representation. The value is expressed in scale of the @timescale of the corresponding Representation. If not present, the value is unknown. |
| @dImax | O | specifies the maximum difference of the Index value of any two consecutive Resync Points that are included in the @type definition above in any Media Segment for this Representation normalized by the @bandwidth value of the Representation. To obtain the maximum difference in bytes, the value of @dImax is multiplied with the @bandwidth value. If not present, the value is unknown. |
| @dImin | OD Default: 0 | specifies the minimum difference of the Index value of any two consecutive Resync Points that are included in the @type definition above in any Media Segment for this Representation normalized by the @bandwidth value of the Representation. To obtain the minimum difference in bytes, the value of @dImax is multiplied with the @bandwidth value. If not present, the value is assumed to be 0. |
| @marker | OD Default: FALSE | If set to TRUE, it specifies that every Resync Point includes a specific marker for Resync Point detection. If not present or FALSE, the presence of a marker for every signalled Resync Point cannot be expected. |
| @index | OD | specifies the template to create the Resync Point Segment List for the defined @type. If present, a Resync Point Index Segment shall be available for every corresponding available Media Segment. For more details, refer to subclause 5.3.9.4.4 of DASH. |

Table 11 provides different random access point types.

TABLE 11

```
<!-- Resync Point -->
<xs:complexType name="ResyncType">
    <xs:attribute name="type" type="SAPType" default="0"/>
    <xs:attribute name="dT" type="xs:unsignedInt"/>
    <xs:attribute name="dImax" type="xsfloat"/>
    <xs:attribute name="dImin" type="xsfloat" default="0"/>
    <xs:attribute name="marker" type="xs:boolean" default="false"/>
    <xs:attribute name="index" type="xs:anyURI"/>
    <xs:anyAttribute namespace="##other" processContents="lax"/>
</xs:complexType>
```

Resync Index Segments contain information that is related to media segments. The resync index segment provides the accurate position of all resync points in the segment, in a similar fashion as the segment index. Resync points are defined in clause 5.3.12.1 of the DASH specification.

A resync point for ISO BMFF may be defined as a start of an ISO BMFF segment with the following restrictions in terms of both cardinality and ordinality:

| NL 0 | Cardinality | Specification | Constraints | Description |
|---|---|---|---|---|
| styp | 0/1 | ISO/IEC 14496-12 | DASH/CMAF constraints | Segment Type Signalling compatibility to CMAF Chunk |
| prft | 0/1 | ISO/IEC 14496-12 | DASH/CMAF constraints | Producer Reference Time |
| emsg | * | ISO/IEC 23009-1 | DASH/CMAF | Event Message constraints |
| moof | 1 | ISO/IEC 14496-12 | DASH/CMAF constraints | Movie Fragment box and the boxes it contains |
| mdat | 1 | ISO/IEC 14496-12 | DASH/CMAF constraints | Media Data container for media samples |

For an ISO BMFF based resync point, properties may be defined as follows:

The index Index is defined as the offset of the first byte of the above constrained ISO BMFF segment.

The earliest presentation time Time is defined as smallest time of the combination of the decode time, the composition offset and the edit list, of any sample in the chunk.

The SAP type is defined according to clause 4.5.2 of the DASH specification.

If the styp is present with 'cmfl' as the main compatibility brand, then the marker is present.

A resync index segment may index one media segment of one representation, and may be defined as follows:

Each representation index segment should begin with an 'styp' box, and the brand 'risg' should be present in the 'styp' box. The conformance requirement of the brand 'risg' is defined by this subclause.

Each media segment is indexed by one or more Segment Index box(es); the boxes for a given media segment are contiguous.

Figure 9:
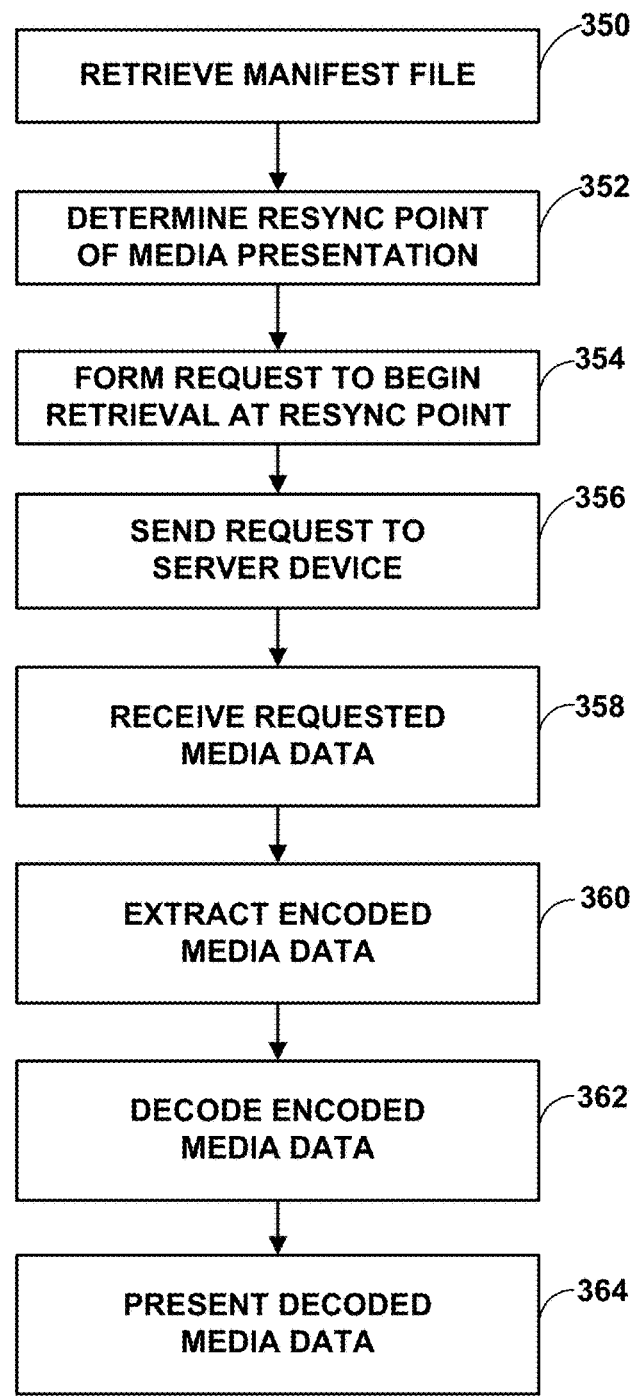
FIG. 9 is a flowchart illustrating an example method of retrieving media data according to the techniques of this disclosure.

FIG. 9 is a flowchart illustrating an example method of retrieving media data according to the techniques of this disclosure. The method of FIG. 9 is explained with respect to client device 40 of FIG. 1. However, low-latency DASH client 232 of FIG. 5, or a client device including media decoder 296, CMAF/FF parser 294, DASH client 292, and ROUTE receiver 290 of FIG. 7 may also be configured to perform this or a similar method.

Initially, client device 40 may retrieve a manifest file (350), such as an MPD, of a media presentation. Client device 40 may retrieve the manifest file from, e.g., server device 60. The manifest file may include data indicating that the media presentation includes resync points at chunk boundaries within segments of a representation of the media presentation. Accordingly, client device 40 may determine a resync point of the media presentation (352), e.g., the resync point that is most recently available. In general, the resync point may indicate the start of a chunk boundary, which is a randomly accessible point of the representation at which file-level containers (e.g., data structures, such as boxes, as discussed above) can be properly parsed.

In particular, the manifest file may indicate a position of the resync point, such as a byte offset from a beginning of a segment. This information may not precisely identify the location of the resync point in the segment, but may guarantee that the resync point will be available within a range of bytes from the byte offset. Thus, client device 40 may form a request, such as an HTTP partial Get request, specifying the indicated byte offset, to begin retrieval at the resync point (354). Client device 40 may then send the request to server device 60 (356).

In response to the request, client device 40 may receive the requested media data (358), including the resync point. As noted above, the byte offset may not precisely identify the location of the resync point, and thus, client device 40 may parse the data until detecting an actual position of the resync point. Client device 40 may, beginning with the resync point, parse file level data structures, such as file format boxes, to determine locations of media data of the corresponding chunks of retrieved media data. In particular, client device 40 may identify the resync point as the start of a chunk by detecting, e.g., a segment type value, a producer reference time value, an event message, movie fragments, and a media data container box. The movie fragments may include encoded media data.

Decapsulation unit 50 may extract encoded media data of the corresponding chunk (360), e.g., from the movie fragments, and provide the encoded media data to, e.g., video decoder 48. The chunk may begin with a random access point (RAP), such as an intra-predicted frame (I-frame) of video data. The manifest file may further indicate whether the RAP is the start of a closed group of pictures (GOP) or an open GOP, and thereby indicate a type of random access that can be performed starting with the RAP (e.g., whether leading pictures of the I-frame are decodable or not decodable). Video decoder 48 may, in turn, decode the encoded media data (362) and send the decoded media data to, e.g., video output 44, to present the media data (364).

In this manner, the method of FIG. 9 represents an example of a method of retrieving media data including retrieving a manifest file for a media presentation indicating that container parsing of media data of a bitstream can be started at a resync point of a segment of a representation of the media presentation, the resync point being at a position other than a start of the segment and representing a point at which the container parsing of the media data of the bitstream can be started; using the manifest file, forming a request to retrieve the media data of the representation starting at the resync point; sending the request to initiate retrieval of the media data of the media presentation starting at the resync point; and presenting the retrieved media data.

Certain techniques of this disclosure are summarized in the following examples:

Example 1: A method of retrieving media data, the method comprising: retrieving a manifest file for a media presentation indicating that resynchronization and decryption can be started at a resync point of a representation of the media presentation; retrieving media data of the representation starting at the resync point; and presenting the retrieved media data.

Example 2: The method of example 1, wherein the resync point comprises a start of a chunk boundary.

Example 3: The method of example 2, wherein the chunk boundary comprises a start of a chunk comprising zero or one segment type values, zero or one producer reference time values, zero or more event messages, at least one movie fragment box, and at least one media data container box.

Example 4: The method of any of examples 1-3, wherein the manifest file indicates availability of the resync point in a segment of the representation.

Example 5: The method of example 4, wherein the resync point is at a position other than a beginning of the segment.

Example 6: The method of any of examples 4 and 5, wherein the manifest file indicates a type of random access that can be performed at the resync point.

Example 7: The method of any of examples 4-6, wherein the manifest file indicates position and timing of the resync point and whether the position and timing information is accurate or is an estimation.

Example 8: The method of any of examples 1-7, wherein the manifest file comprises a media presentation description (MPD).

Example 9: A device for retrieving media data, the device comprising one or more means for performing the method of any of examples 1-8.

Example 10: The device of example 9, wherein the one or more means comprise one or more processors implemented in circuitry and a memory configured to store media data.

Example 11: The device of example 9, wherein the device comprises at least one of: an integrated circuit; a microprocessor; or a wireless communication device.

Example 12: A computer-readable storage medium having stored thereon instructions that, when executed, cause a processor to perform the method of any of examples 1-8.

Example 13: A device for retrieving media data, the device comprising: means for retrieving a manifest file for a media presentation indicating that resynchronization and decryption can be started at a resync point of a representation of the media presentation; means for retrieving media data of the representation starting at the resync point; and means for presenting the retrieved media data.

Example 14: A method of sending media data, the method comprising: sending a manifest file for a media presentation indicating that resynchronization and decryption can be started at a resync point of a representation of the media presentation to a client device; receiving a request for media data starting at the resync point from the client device; and sending the requested media data of the representation starting at the resync point to the client device in response to the request.

Example 15: The method of example 14, further comprising generating the manifest file.

Example 16: The method of any of examples 14 and 15, wherein the resync point comprises a start of a chunk boundary.

Example 17: The method of example 16, wherein the chunk boundary comprises a start of a chunk comprising zero or one segment type values, zero or one producer reference time values, zero or more event messages, at least one movie fragment box, and at least one media data container box.

Example 18: The method of any of examples 14-17, wherein the manifest file indicates availability of the resync point in a segment of the representation.

Example 19: The method of example 18, wherein the resync point is at a position other than a beginning of the segment.

Example 20: The method of any of examples 18 and 19, wherein the manifest file indicates a type of random access that can be performed at the resync point.

Example 21: The method of any of examples 18-20, wherein the manifest file indicates position and timing of the resync point and whether the position and timing information is accurate or is an estimation.

Example 22: The method of any of examples 14-21, wherein the manifest file comprises a media presentation description (MPD).

Example 23: A device for sending media data, the device comprising one or more means for performing the method of any of examples 14-22.

Example 24: The device of example 23, wherein the one or more means comprise one or more processors implemented in circuitry and a memory configured to store media data.

Example 25: The device of example 23, wherein the device comprises at least one of: an integrated circuit; a microprocessor; or a wireless communication device.

Example 26: A computer-readable storage medium having stored thereon instructions that, when executed, cause a processor to perform the method of any of examples 1-8.

Example 27: A device for sending media data, the device comprising: means for sending a manifest file for a media presentation indicating that resynchronization and decryption can be started at a resync point of a representation of the media presentation to a client device; means for receiving a request for media data starting at the resync point from the client device; and means for sending the requested media data of the representation starting at the resync point to the client device in response to the request.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:
   retrieving a manifest file for a media presentation indicating a location of a resync point in a segment of a representation of the media presentation, the manifest file further indicating that file-level container parsing of media data of a bitstream can be started at the resync point, the location of the resync point being at a position other than a start of the segment and representing a point at which the file-level container parsing of the media data of the bitstream can be started and representing that a random access point (RAP) of the media data will be included in a file-level container at or following the resync point;
   using the manifest file, forming a request to retrieve the media data of the representation starting at the location of the resync point;
   sending the request to initiate retrieval of the media data of the media presentation starting at the resync point;
   parsing the media data starting at the resync point and determining that the RAP of the media data follows the resync point and presenting the retrieved media data including and following the RAP of the media data and not presenting the retrieved media data from the resync point to the RAP of the media data.

2. The method of claim 1, wherein presenting the retrieved media data comprises parsing file-level media data containers of the retrieved media data at the resync point.

3. The method of claim 2, wherein parsing comprises:
   parsing the file-level media data containers until detecting the RAP of the media data; and
   sending the RAP to a media decoder.

4. The method of claim 2, wherein the chunk boundary comprises a start of a chunk comprising zero or one segment type values, zero or one producer reference time values, zero or more event messages, at least one movie fragment box, and at least one media data container box.

5. The method of claim 1, wherein the resync point comprises a start of a chunk boundary.

6. The method of claim 1, wherein the manifest file indicates availability of the resync point in the segment of the representation.

7. The method of claim 6, wherein the manifest file indicates a type of random access that can be performed at the resync point.

8. The method of claim 6, wherein the manifest file indicates position and timing of the resync point and whether the position and timing information is accurate or is an estimation.

9. The method of claim 1, wherein the manifest file comprises a media presentation description (MPD).

10. The method of claim 1, wherein retrieving the manifest file comprises retrieving the manifest file before the segment has been fully formed, wherein sending the request to initiate retrieval of the media data comprises sending the request to initiate retrieval of the media data as a live stream in which segments of the media presentation are not fully formed in advance of retrieval of at least some of the segments.

11. A device for retrieving media data, the device comprising:
a memory configured to store media data of a media presentation; and
one or more processors implemented in circuitry configured to:
retrieve a manifest file for a media presentation indicating a location of a resync point in a segment of a representation of the media presentation, the manifest file further indicating that file-level container parsing of media data of a bitstream can be started at the resync point, the location of the resync point being at a position other than a start of the segment and representing a point at which the file-level container parsing of the media data of the bitstream can be started and representing that a random access point (RAP) of the media data will be included in a file-level container at or following the resync point;
use the manifest file to form a request to retrieve the media data of the representation starting at the location of the resync point;
send the request to initiate retrieval of the media data of the media presentation starting at the resync point;
parse the media data starting at the resync point and determine that the RAP of the media data follows the resync point; and
present the retrieved media data including and following the RAP of the media data and not present the retrieved media data from the resync point to the RAP of the media data.

12. The device of claim 11, wherein to present the retrieved media data, the one or more processors are configured to parse file-level media data containers of the retrieved media data at the resync point.

13. The device of claim 12, wherein to parse the file-level media data containers, the one or more processors are configured to:
parse the file-level media data containers until detecting the RAP of the media data; and
send the RAP to a media decoder.

14. The device of claim 11, wherein the resync point comprises a start of a chunk boundary.

15. The device of claim 14, wherein the chunk boundary comprises a start of a chunk comprising zero or one segment type values, zero or one producer reference time values, zero or more event messages, at least one movie fragment box, and at least one media data container box.

16. The device of claim 11, wherein the manifest file indicates availability of the resync point in the segment of the representation.

17. The device of claim 16, wherein the manifest file indicates a type of random access that can be performed at the resync point.

18. The device of claim 16, wherein the manifest file indicates position and timing of the resync point and whether the position and timing information is accurate or is an estimation.

19. The device of claim 11, wherein the manifest file comprises a media presentation description (MPD).

20. The device of claim 11, wherein the one or more processors are configured to retrieve the manifest file before the segment has been fully formed, and wherein the one or more processors are configured to send the request to initiate retrieval of the media data as a live stream in which segments of the media presentation are not fully formed in advance of retrieval of at least some of the segments.

21. A computer-readable storage medium having stored thereon instructions that, when executed, cause a processor to:
retrieve a manifest file for a media presentation indicating a location of a resync point in a segment of a representation of the media presentation, the manifest file further indicating that file-level container parsing of media data of a bitstream can be started at the resync point, the location of the resync point being at a position other than a start of the segment and representing a point at which the file-level container parsing of the media data of the bitstream can be started and representing that a random access point (RAP) of the media data will be included in a file-level container at or following the resync point;
use the manifest file to form a request to retrieve the media data of the representation starting at the location of the resync point;
send the request to initiate retrieval of the media data of the media presentation starting at the resync point;
parse the media data starting at the resync point and determine that the RAP of the media data follows the resync point; and
present the retrieved media data including and following the RAP of the media data and not present the retrieved media data from the resync point to the RAP of the media data.

22. The computer-readable storage medium of claim 21, wherein the resync point comprises a start of a chunk boundary.

23. The computer-readable storage medium of claim 22, wherein the chunk boundary comprises a start of a chunk comprising zero or one segment type values, zero or one producer reference time values, zero or more event messages, at least one movie fragment box, and at least one media data container box.

24. The computer-readable storage medium of claim 21, wherein the manifest file indicates availability of the resync point in the segment of the representation.

25. The computer-readable storage medium of claim 24, wherein the manifest file indicates a type of random access that can be performed at the resync point.

26. The computer-readable storage medium of claim 24, wherein the manifest file indicates position and timing of the resync point and whether the position and timing information is accurate or is an estimation.

27. The computer-readable storage medium of claim 21, wherein the manifest file comprises a media presentation description (MPD).

28. The computer-readable storage medium of claim 21, wherein the instructions that cause the processor to retrieve the manifest file comprise instructions that cause the processor to retrieve the manifest file before the segment has been fully formed, and wherein the instructions that cause the processor to send the request to initiate retrieval of the media data comprise instructions that cause the processor to send the request to initiate retrieval of the media data as a live stream in which segments of the media presentation are not fully formed in advance of retrieval of at least some of the segments.

29. A device for retrieving media data, the device comprising:
- means for retrieving a manifest file for a media presentation indicating a location of a resync point in a segment of a representation of the media presentation, the manifest file further indicating that file-level container parsing of media data of a bitstream can be started at the resync point, the location of the resync point being at a position other than a start of the segment and representing a point at which the file-level container parsing of the media data of the bitstream can be started and representing that a random access point (RAP) of the media data will be included in a file-level container at or following the resync point;
- means for using the manifest file, forming a request to retrieve the media data of the representation starting at the location of the resync point;
- means for sending the request to initiate retrieval of the media data of the media presentation starting at the resync point;
- means for parsing the media data starting at the resync point and determining that the RAP of the media data follows the resync point; and
- means for presenting the retrieved media data including and following the RAP of the media data and not presenting the retrieved media data from the resync point to the RAP of the media data.

* * * * *